(12) United States Patent
Yin et al.

(10) Patent No.: US 10,810,783 B2
(45) Date of Patent: Oct. 20, 2020

(54) DYNAMIC REAL-TIME TEXTURE ALIGNMENT FOR 3D MODELS

(71) Applicant: VanGogh Imaging, Inc., McLean, VA (US)

(72) Inventors: Jun Yin, McLean, VA (US); Geng Li, Fairfax, VA (US)

(73) Assignee: VanGogh Imaging, Inc., McLean, VA (US)

(*) Notice: Subject to any disclaimer, the term of this patent is extended or adjusted under 35 U.S.C. 154(b) by 0 days.

(21) Appl. No.: 16/374,023

(22) Filed: Apr. 3, 2019

(65) Prior Publication Data
US 2019/0304161 A1   Oct. 3, 2019

Related U.S. Application Data

(60) Provisional application No. 62/652,051, filed on Apr. 3, 2018.

(51) Int. Cl.
*G06T 15/04* (2011.01)
*G06T 3/40* (2006.01)
(Continued)

(52) U.S. Cl.
CPC .............. *G06T 15/04* (2013.01); *G06T 3/40* (2013.01); *G06T 15/50* (2013.01); *G06T 17/20* (2013.01)

(58) Field of Classification Search
CPC .......... G06T 15/04; G06T 3/40; G06T 15/50; G06T 17/20; G06T 19/20; G06T 17/00;
(Continued)

(56) References Cited

U.S. PATENT DOCUMENTS

| 5,675,326 A | 10/1997 | Juds et al. |
| 6,259,815 B1 | 7/2001 | Anderson et al. |

(Continued)

FOREIGN PATENT DOCUMENTS

| EP | 1308902 A2 | 5/2003 |
| KR | 10-1054736 B1 | 8/2011 |

(Continued)

OTHER PUBLICATIONS

Rossignac, J. et al., "3D Compression Made Simple: Edgebreaker on a Corner-Table," Invited lecture at the Shape Modeling International Conference, Genoa, Italy (Jan. 30, 2001), pp. 1-6.
(Continued)

*Primary Examiner* — Xilin Guo
(74) *Attorney, Agent, or Firm* — Proskauer Rose LLP

(57) ABSTRACT

Described herein are methods and systems for dynamic real-time texture alignment for three-dimensional (3D) models. A computing device receives input images of objects in a scene, and generates a 3D model for at least one of the objects, comprising a plurality of mesh triangles. The computing device projects each mesh triangle of the 3D model to one of the input images. The computing device measures a texture discontinuity between adjacent mesh triangles of the projected image by comparing color differences in a shared edge of the adjacent mesh triangles. The computing device translates a texture associated with the adjacent mesh triangles in different directions to create texture candidates. The computing device applies the texture candidates to the corresponding mesh triangles until a seamless texture join is formed on the shared edge. The computing device generates a textured 3D model using the 3D model, the projected image, and the texture candidates.

16 Claims, 9 Drawing Sheets

(51) Int. Cl.
  *G06T 15/50* (2011.01)
  *G06T 17/20* (2006.01)
(58) Field of Classification Search
  CPC ..... G06T 17/10; G06T 2210/36; G06T 19/00; G06F 3/04815; G06F 17/11; G06F 2111/02
  See application file for complete search history.

(56) References Cited

U.S. PATENT DOCUMENTS

| | | |
|---|---|---|
| 6,275,235 B1 | 8/2001 | Morgan, III |
| 6,525,722 B1 | 2/2003 | Deering |
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1 | 8/2015 | Rogers et al. |
| 9,171,402 B1 | 10/2015 | Allen et al. |
| 9,607,388 B2 | 5/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0291278 A1 | 11/2008 | Zhang et al. |
| 2008/0310757 A1 | 12/2008 | Wolberg et al. |
| 2009/0232353 A1 | 9/2009 | Sundaresan et al. |
| 2010/0111370 A1 | 5/2010 | Black et al. |
| 2010/0198563 A1* | 8/2010 | Plewe ............ G06F 30/392 703/1 |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2013/0226528 A1 | 8/2013 | Hodgins et al. |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1* | 2/2015 | Chang ............ G05B 19/41865 700/97 |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2016/0026253 A1 | 1/2016 | Bradski et al. |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0069124 A1 | 3/2017 | Tong et al. |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2017/0372505 A1 | 12/2017 | Bhat et al. |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0300937 A1 | 10/2018 | Chien et al. |
| 2019/0244412 A1* | 8/2019 | Yago Vicente ......... G06T 15/04 |

FOREIGN PATENT DOCUMENTS

| | | |
|---|---|---|
| KR | 10-2011-0116671 A | 10/2011 |
| WO | 2006027339 A2 | 3/2006 |

OTHER PUBLICATIONS

Melax, S., "A Simple, Fast, and Effective Polygon Reduction Algorithm," Game Developer, Nov. 1998, pp. 44-49.
Myronenko, A. et al., "Point Set Registration: Coherent Point Drift," IEEE Transactions on Pattern Analysis and Machine Intelligence, vol. 32, No. 12, Dec. 2010, pp. 2262-2275.
Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.
Izadi, S. et al., "KinectFusion: Real-time 3D Reconstruction and Interaction Using a Moving Depth Camera," UIST '11, Oct. 16-19, 2011, 10 pages.
Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.
Biegelbauer, Georg et al., "Model-based 3D object detection—Efficient approach using superquadrics," Machine Vision and Applications, Jun. 2010, vol. 21, Issue 4, pp. 497-516.
Kanezaki, Asako et al., "High-speed 3D Object Recognition Using Additive Features in a Linear Subspace," 2010 IEEE International Conference on Robotics and Automation, Anchorage Convention District, May 3-8, 2010, pp. 3128-3134.
International Search Report and Written Opinion from PCT patent application No. PCT/US13/062292, dated Jan. 28, 2014, 10 pages.
International Search Report and Written Opinion from PCT patent application No. PCT/US14/045591, dated Nov. 5, 2014, 9 pages.
Sumner, R. et al., "Embedded Deformation for Shape Manipulation," Applied Geometry Group, ETH Zurich, SIGGRAPH 2007, 7 pages.
Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.
Kim, Young Min, et al., "Guided Real-Time Scanning of Indoor Objects," Computer Graphics Forum, vol. 32, No. 7 (2013), 10 pages.
Rusinkewicz, Szymon, et al., "Real-time 3D model acquisition," ACM Transactions on Graphics (TOG) 21.3 (2002), pp. 438-446.
European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.

(56) References Cited

OTHER PUBLICATIONS

Stoll, C., et al., "Template Deformation for Point Cloud Filtering," Eurographics Symposium on Point-Based Graphics (2006), 9 pages.

Allen, Brett, et al., "The space of human body shapes: reconstruction and parameterization from range scans," ACM Transactions on Graphics (TOG), vol. 22, Issue 3, Jul. 2003, pp. 587-594.

International Search Report and Written Opinion from PCT patent application No. PCT/US15/49175, dated Feb. 19, 2016, 14 pages.

Harris, Chris & Mike Stephens, "A Combined Corner and Edge Detector," Plessey Research Roke Manor, U.K. (1988), pp. 147-151.

Bay, Herbert, et al., "Speeded-Up Robust Features (SURF)," Computer Vision and Image Understanding 110 (2008), pp. 346-359.

Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.

Lowe, David G., "Distinctive Image Features from Scale-Invariant Keypoints," International Journal of Computer Vision, vol. 60, Issue 2, Nov. 2004, pp. 91-110.

Kaess, Michael, et al., "iSAM Incremental Smoothing and Mapping," IEEE Transactions on Robotics, Manuscript, Sep. 7, 2008, 14 pages.

Kummerle, Rainer, et al., "g2o: A General Framework for Graph Optimization," 2011 IEEE International Conference on Robotics and Automation, May 9-13, 2011, Shanghai, China, 7 pages.

\* cited by examiner

DYNAMIC REAL-TIME TEXTURE ALIGNMENT FOR 3D MODELS

RELATED APPLICATIONS

This application claims priority to U.S. Provisional Patent Application No. 62/652,051, filed on Apr. 3, 2018, the entirety of which is incorporated herein by reference.

TECHNICAL FIELD

This subject matter of this application relates generally to methods and apparatuses, including computer program products, for dynamic real-time texture alignment for three-dimensional (3D) models.

BACKGROUND

Generally, existing computerized techniques to apply texture to 3D models comprise stitching together a plurality of two-dimensional (2D) images on the surface of the 3D model. However, these techniques usually produce a texture projection that is inaccurate due to errors in surface location/camera parameters and geometric errors. As a result, undesirable artifacts appear in the initial texture. An example of such artifacts is shown in FIG. 1, which depicts a textured model of a turtle's back. The circled areas in FIG. 1 denote seams on the turtle's back that are misaligned at the boundary between two different images.

SUMMARY

Therefore, what is needed are methods and systems for eliminating such artifacts when applying textures to a 3D model, so that the resulting texture is seamless. The techniques described herein provide a dynamic, real-time texture alignment process that overcomes the aforementioned drawbacks to advantageously create a texture on a 3D model that does not contain any visual artifacts. The techniques described herein utilize a combination of a Markov Random Field (MRF) algorithm with a graph cut/alpha expansion algorithm to provide a photorealistic 3D model alignment from multiple images.

In the methods and systems described herein, texture projection is treated as an optimization of image stitching. Each triangular mesh of the model's surface is projected onto the best image as its texture content. The methods and systems make local image-space translation shifts to generate a seamless texture between adjacent triangular meshes. The techniques provide for searching a best texture label for each triangular mesh, which results in a MRF problem and corresponding solution.

It should be appreciated that an MRF strategy has been used in existing systems to align multiple images. However, MRF is typically very slow—e.g., taking several minutes, which makes it impractical to be used in real-time dynamic 3D model texturing. The systems and methods described herein overcome this limitation by providing real-time performance while still being just as reliable. The methods described herein finish within seconds, or less than a second in some cases. The fast processing time enables the system to conduct real-time dynamic 3D capture while being able to provide photorealistic 3D model alignment from multiple images. The key to achieving this result is the combination of MRF with graph cut/alpha expansion.

In addition, other optimization methods can be used to further speed up the methodology described herein, such as Pyramid & Energy function simplification. Also, it should be appreciated that the techniques described herein can be implemented as part of hardware (e.g., an IP Block) to further speed up performance.

The invention, in one aspect, features a system for dynamic real-time texture alignment for three-dimensional (3D) models. The system comprises a memory that stores computer-executable instructions and a processor that executes the computer-executable instructions. The processor receives a plurality of input images of one or more objects in a scene, and generates a 3D model for at least one of the one or more objects in the scene, the 3D model comprising a plurality of mesh triangles. The processor projects each mesh triangle of the 3D model to one of the plurality of input images. The processor measures a texture discontinuity between adjacent mesh triangles of the projected input image by comparing one or more color differences in a shared edge of the adjacent mesh triangles. The processor translates a texture associated with each of the adjacent mesh triangles in a plurality of different directions to create texture candidates for each of the adjacent mesh triangles. The processor applies each of the texture candidates to the corresponding mesh triangles until a seamless texture join is formed on the shared edge. The processor generates a textured 3D model using the 3D model, the projected input image, and the texture candidates that form the seamless texture join for each adjacent mesh triangle.

The invention, in another aspect, features a computerized method of dynamic real-time texture alignment for three-dimensional (3D) models. A computing device receives a plurality of input images of one or more objects in a scene, and generates a 3D model for at least one of the one or more objects in the scene, the 3D model comprising a plurality of mesh triangles. The computing device projects each mesh triangle of the 3D model to one of the plurality of input images. The computing device measures a texture discontinuity between adjacent mesh triangles of the projected input image by comparing one or more color differences in a shared edge of the adjacent mesh triangles. The computing device translates a texture associated with each of the adjacent mesh triangles in a plurality of different directions to create texture candidates for each of the adjacent mesh triangles. The computing device applies each of the texture candidates to the corresponding mesh triangles until a seamless texture join is formed on the shared edge. The computing device generates a textured 3D model using the 3D model, the projected input image, and the texture candidates that form the seamless texture join for each adjacent mesh triangle.

Any of the above aspects can include one or more of the following features. In some embodiments, applying each of the texture candidates to the corresponding mesh triangles until a seamless texture join is formed on the shared edge comprises determining an optimal texture labeling for each mesh triangle of the projected input image using an energy minimization algorithm, downsampling the projected input image to generate an intermediate image, the intermediate image comprising a decreased resolution in one or more dimensions, determining an optimal texture labeling for each mesh triangle of the intermediate image using the energy minimization algorithm and the optimal texture labeling for each mesh triangle from the projected input image, downsampling the intermediate image to generate a target image, determining an optimal texture labeling for each mesh triangle of the target image using the energy minimization algorithm and the optimal texture labeling for each mesh triangle from the intermediate image, selecting a texture candidate that corresponds to the optimal texture labeling for each mesh triangle of the target image, and applying the selected texture candidate to the corresponding mesh triangle of the projected input image.

In some embodiments, the optimal texture labeling for each mesh triangle of the target image comprises a texture labeling associated with a minimum energy value determined by the energy minimization algorithm using the optimal texture labeling for each mesh triangle from the intermediate image as input. In some embodiments, the optimal texture labeling for each mesh triangle of the intermediate image comprises a texture labeling associated with a minimum energy value determined by the energy minimization algorithm using the optimal texture labeling for each mesh triangle from the projected input image as input. In some embodiments, the optimal texture labeling for each mesh triangle of the projected input image comprises a texture labeling associated with a minimum energy value determined by the energy minimization algorithm.

In some embodiments, the energy minimization algorithm is an alpha-expansion algorithm. In some embodiments, the plurality of input images are high-definition (HD) images. In some embodiments, information corresponding to the textured 3D model is stored as an .obj file, an .mtl file, and a .jpg file. In some embodiments, translating the texture associated with each of the adjacent mesh triangles in a plurality of different directions comprises translating each texture in nine different directions.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
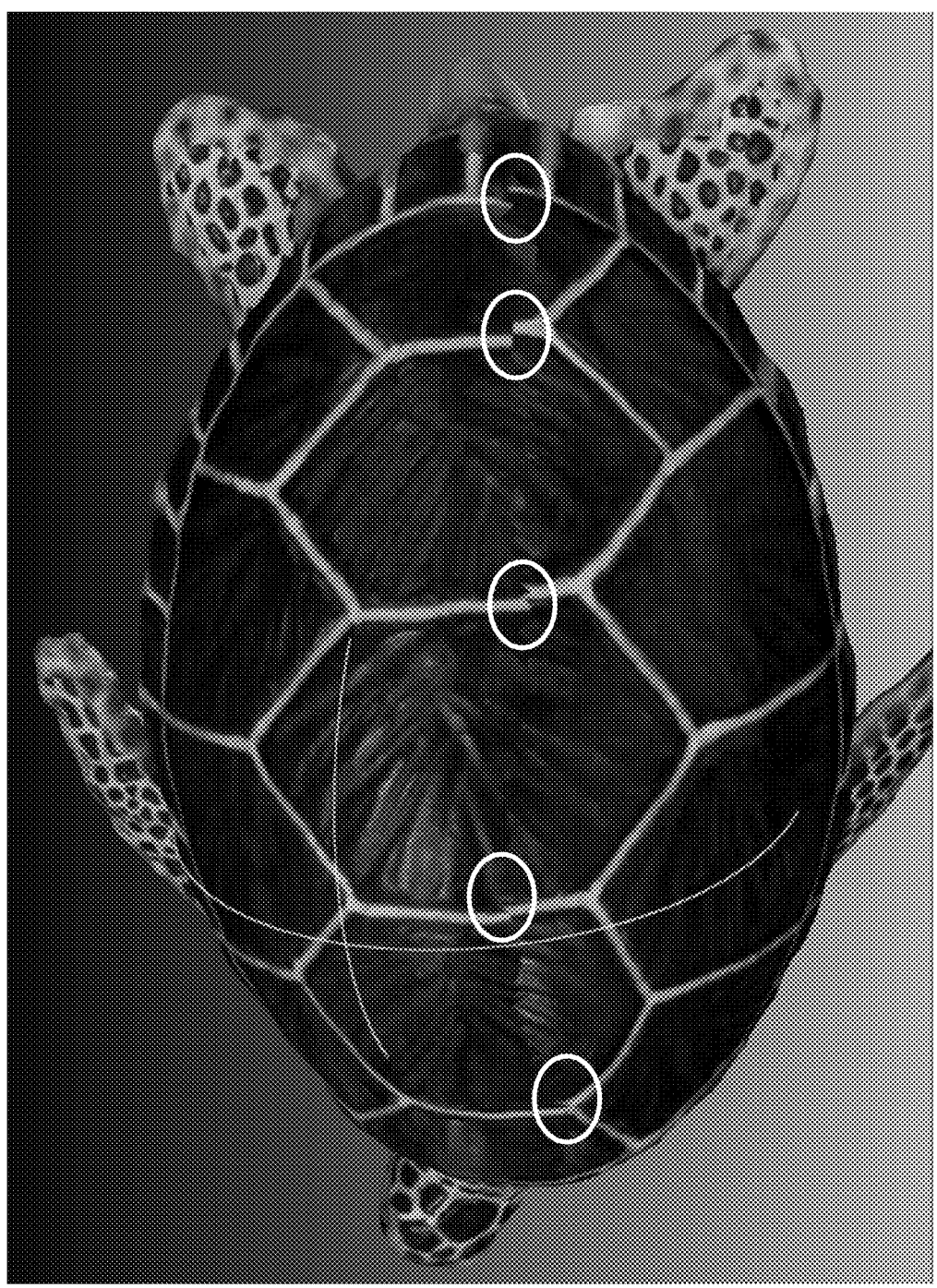
FIG. 1 is an image of a 3D model with a texture containing visual artifacts.
Figure 2:
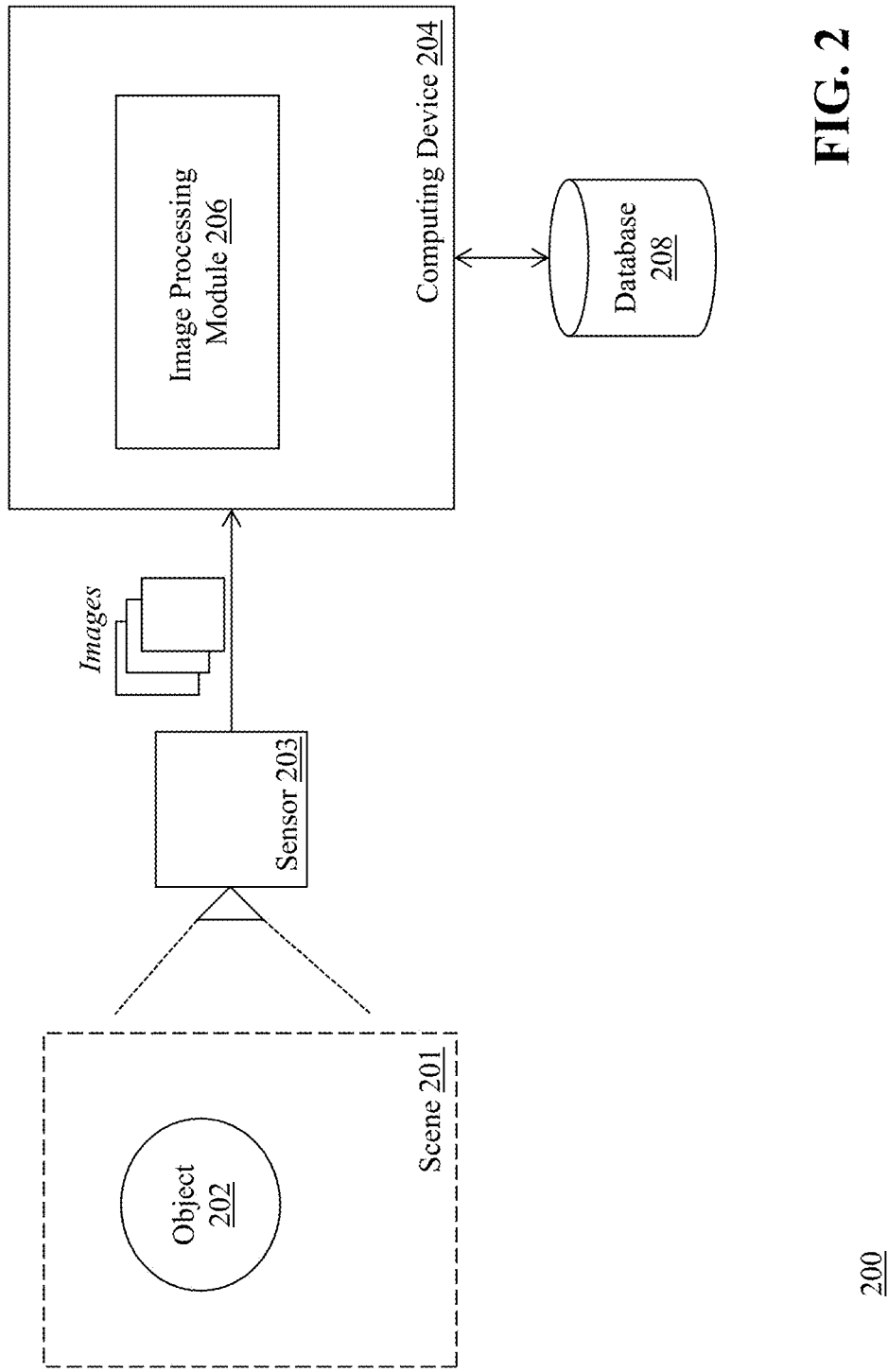
FIG. 2 is a block diagram of a system for dynamic real-time texture alignment for three-dimensional (3D) models.

FIG. 2 is a block diagram of a system 200 for dynamic real-time texture alignment for three-dimensional (3D) models. Certain embodiments of the systems and methods described in this application utilize:

the real-time object recognition and modeling techniques as described in U.S. Pat. No. 9,715,761, titled "Real-Time 3D Computer Vision Processing Engine for Object Recognition, Reconstruction, and Analysis;"

the dynamic 3D modeling techniques as described in U.S. patent application Ser. No. 14/849,172, titled "Real-Time Dynamic Three-Dimensional Adaptive Object Recognition and Model Reconstruction;"

the shape-based registration and modeling techniques described in U.S. Pat. No. 10,169,676, titled "Shape-Based Registration for Non-Rigid Objects with Large Holes;"

the 3D photogrammetry techniques described in U.S. Pat. No. 10,192,347, titled "3D Photogrammetry;"

the sparse SLAM techniques described in U.S. patent application Ser. No. 15/638,278, titled "Sparse Simultaneous Localization and Mapping with Unified Tracking;"

the 2D and 3D video compression techniques described in U.S. patent application Ser. No. 15/726,316, titled "Real-Time Remote Collaboration and Virtual Presence using Simultaneous Localization and Mapping to Construct a 3D Model and Update a Scene Based on Sparse Data;"

the 4D hologram technology described in U.S. patent application Ser. No. 16/240,404, titled "4D Hologram: Real-Time Remote Avatar Creation and Animation Control;" and the implementation of 3D vision algorithms in hardware, such as an IP block, as described in U.S. patent application Ser. No. 16/359,750, titled "3D Vision Processing Using an IP Block."

Each of the above-referenced patents and patent applications is incorporated by reference herein in its entirety. The methods and systems described in the above patents and patent applications, and in the present patent application, are available by implementing the Starry Night SDK, available from VanGogh Imaging, Inc. of McLean, Va.

The system includes a sensor 203 coupled to a computing device 204. The computing device 204 includes an image processing module 206. In some embodiments, the computing device can also be coupled to a data storage module 208, e.g., used for storing certain 3D models, color images, and other data as described herein. The sensor 203 is positioned to capture images (e.g., color images) of a scene 201 which includes one or more physical objects (e.g., object 202). Exemplary sensors that can be used in the system 200 include, but are not limited to, 3D scanners, digital cameras, and other types of devices that are capable of capturing depth information of the pixels along with the images of a real-world object and/or scene to collect data on its position, location, and appearance. In some embodiments, the sensor 203 is embedded into the computing device 204, such as a camera in a smartphone, for example.

An exemplary sensor 203 can be a 3D scanner built from combining a depth camera and a high-resolution RGB camera. The cameras can be calibrated so their data can be registered to each other. In one embodiment, the sensor 203 includes an Orbbec Astra Mini depth camera attached to, e.g., a mobile device with an embedded camera. It should be appreciated that other combinations of these devices or other devices can be used to perform the techniques described herein.

The computing device 204 receives images (also called scans) of the scene 201 from the sensor 203 and processes the images to generate 3D models of objects (e.g., object 202) represented in the scene 201. The computing device 204 can take on many forms, including both mobile and non-mobile forms. Exemplary computing devices include, but are not limited to, a laptop computer, a desktop computer, a tablet computer, a smart phone, an internet of things (IoT) device, augmented reality (AR)/virtual reality (VR) devices (e.g., glasses, headset apparatuses, and so forth), or the like. In some embodiments, the sensor 203 and computing device 204 can be embedded in a larger mobile structure such as a robot or unmanned aerial vehicle (UAV). It should be appreciated that other computing devices can be used without departing from the scope of the invention. The computing device 204 includes network-interface components to connect to a communications network. In some embodiments, the network-interface components include components to connect to a wireless network, such as a Wi-Fi or cellular network, in order to access a wider network, such as the Internet.

The computing device 204 includes an image processing module 206 configured to receive images captured by the sensor 203 and analyze the images in a variety of ways, including detecting the position and location of objects represented in the images and generating 3D models of objects in the images.

The image processing module 206 is a hardware and/or software module that resides on the computing device 204 to perform functions associated with analyzing images capture by the scanner, including the generation of 3D models (e.g., .OBJ files, .JPG files, .MTL files) based upon objects in the images. In some embodiments, the functionality of the image processing module 206 is distributed among a plurality of computing devices. In some embodiments, the image processing module 206 operates in conjunction with other modules that are either also located on the computing device 204 or on other computing devices coupled to the computing device 204. It should be appreciated that any number of computing devices, arranged in a variety of architectures, resources, and configurations (e.g., cluster computing, virtual computing, cloud computing) can be used without departing from the scope of the invention. An exemplary image processing module 206 is the Starry Night SDK, available from VanGogh Imaging, Inc. of McLean, Va.

It should be appreciated that in one embodiment, the image processing module 206 comprises specialized hardware (such as a processor or system-on-chip) that is embedded into, e.g., a circuit board or other similar component of another device. In this embodiment, the image processing module 206 is specifically programmed with the image processing and modeling software functionality described below.

Figure 3:
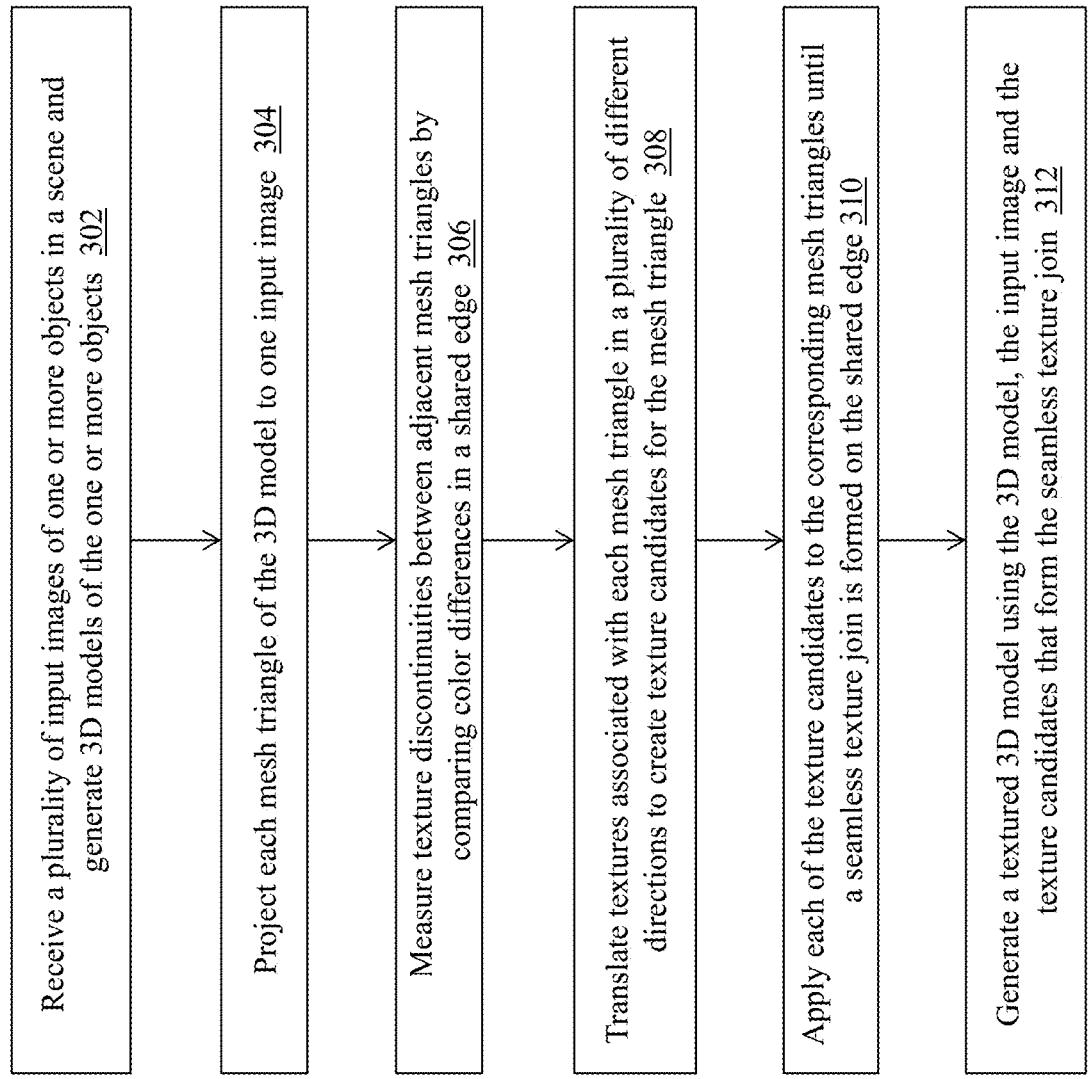
FIG. 3 is a flow diagram of a computerized method for executing a MRF model algorithm.
Figure 4:
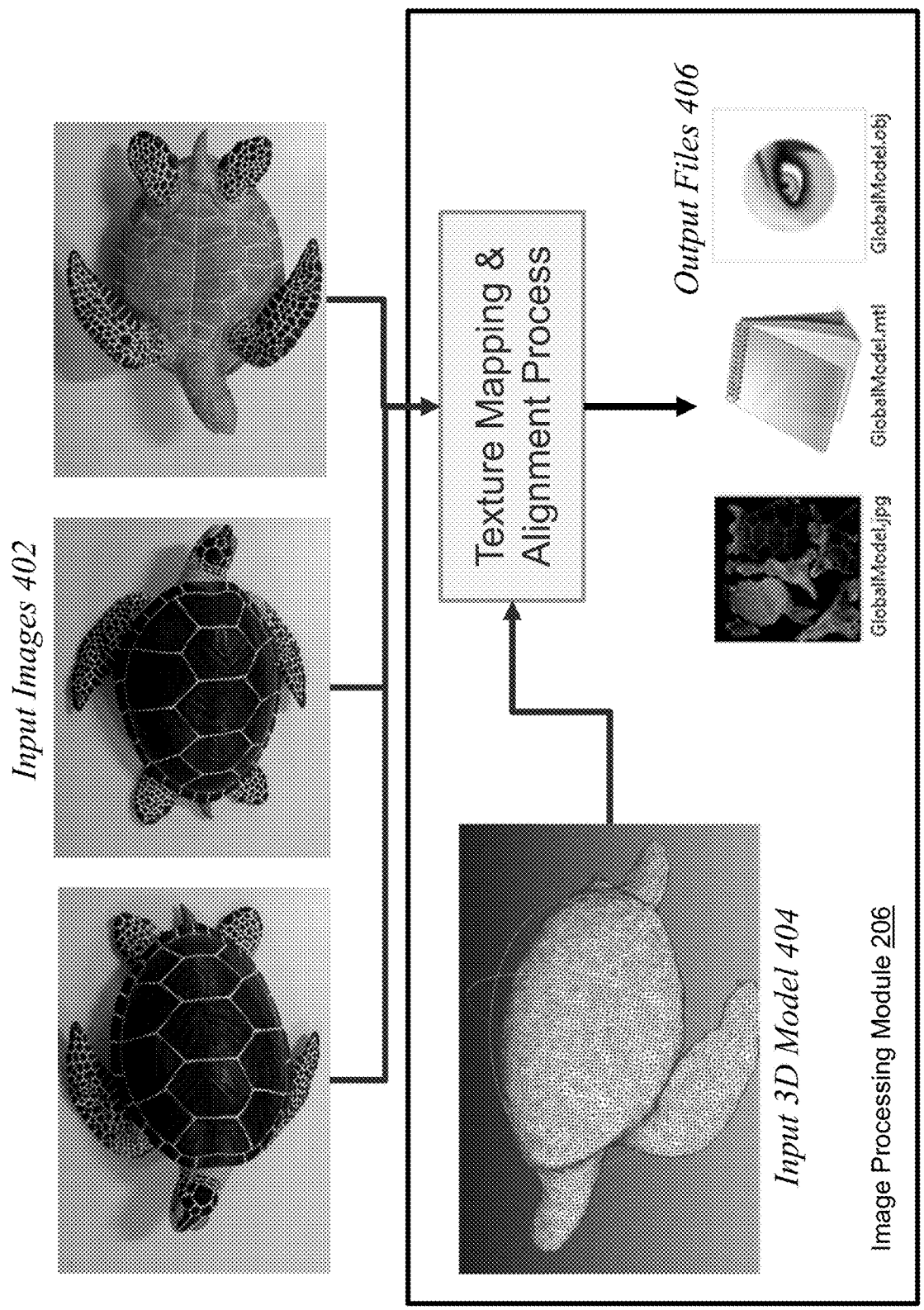
FIG. 4 depicts a plurality of input images of the object, and the 3D model of the object and corresponding files as generated by an image processing module.

The image processing module 206 of computing device 204 executes a Markov Random Field (MRF) model algorithm to create and apply a seamless, photorealistic texture to a 3D model. FIG. 3 is a flow diagram of a computerized method for executing a MRF model algorithm, using the system 200 of FIG. 2. The image processing module 206 receives (302) a plurality of input images (e.g., as captured by the sensor 203) of one or more objects 202 in a scene 201, and generates (302) a 3D model of the object. In this example, the object 202 is a turtle. It should be appreciated that the 3D model of the object can be generated by the image processing module 206 using one or more of the object recognition/3D reconstruction techniques described in the patents and patent applications incorporated by reference herein. FIG. 4 depicts a plurality of input images 402 of the object (e.g., as received from sensor 203), and the input 3D model 404 of the object as generated by the image processing module 206, used by the process of FIG. 3, to generate output files 406 (i.e., GlobalModel.obj, GlobalModel.mtl, and GlobalModel.jpg), which are generated by the module 206 to store 3D model information (e.g., in database 208). It should be appreciated that these file types can be readily imported into a variety of different 3D graphics software platforms. In this example, the input images 402 are high-definition (HD) images.

Figure 5:
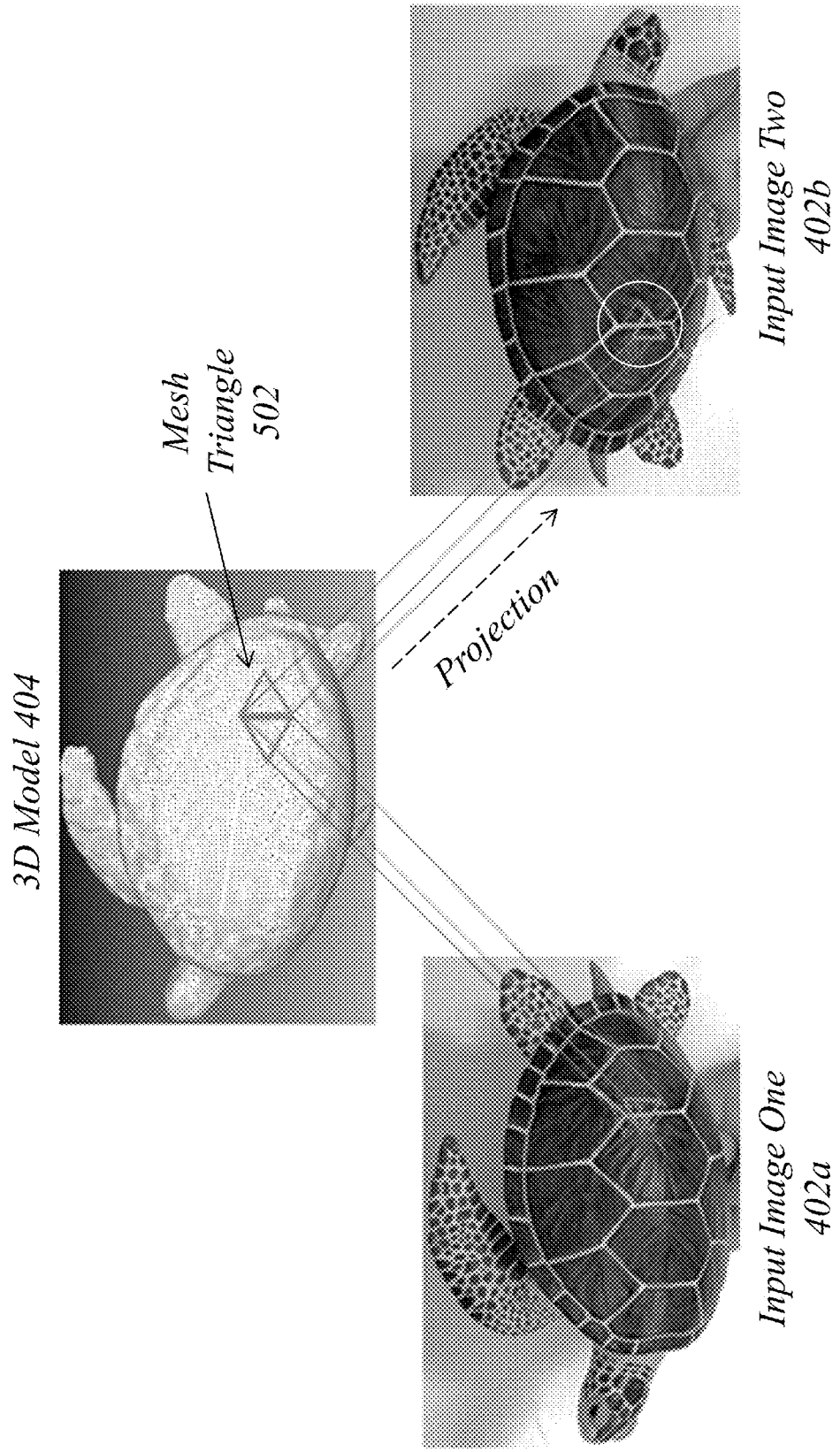
FIG. 5 depicts an example of how the image processing module projects the mesh triangles onto one of the input images.

Once the image processing module 206 has captured the images 402 and 3D model 404 of the object, the module 206 projects (304) each mesh triangle to one HD input image. FIG. 5 depicts an example of how the image processing module 206 projects the mesh triangles onto one of the input images. As shown in FIG. 5, the module 206 projects a mesh triangle 502 from the 3D model 404 onto one of the input images (i.e., Input Image One 402a or Input Image Two 402b)—for example, a projection is shown in the area denoted by the white circle in image 402b. The module 206 then uses the portion of the image that corresponds to the projected triangle as texture for the 3D model 404.

Figure 6:
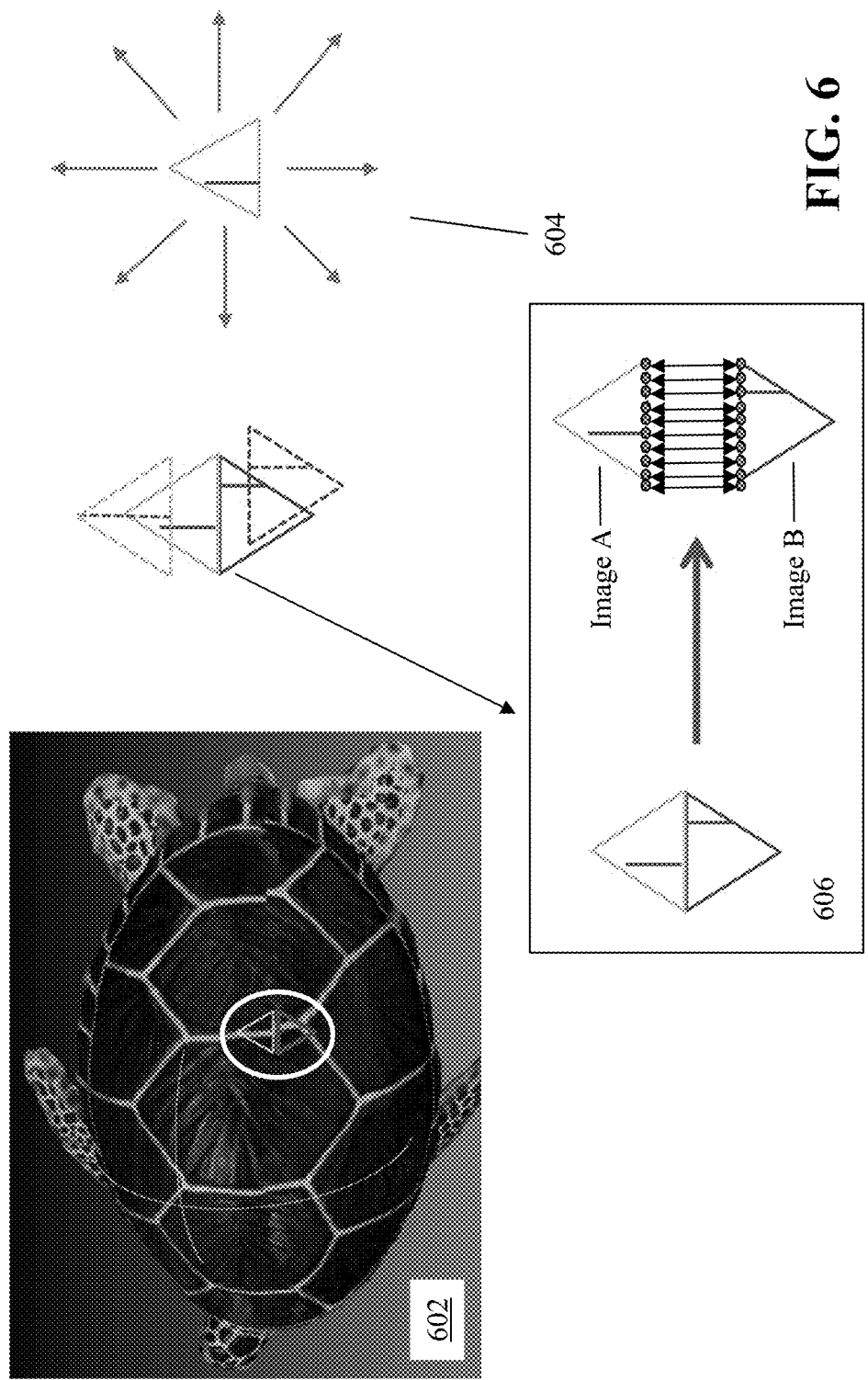
FIG. 6 depicts an example of texture translation using texture candidates for a triangle.

After projecting the textures from two images, the texture on the 3D model can show a misaligned texture between two adjacent triangles—as seen in FIG. 6, the left-hand image 602 shows two triangles that correspond to a misaligned texture (in the area denoted by the white circle). The image processing module 206 then measures (306) the texture discontinuities between the adjacent triangular meshes by comparing the color differences in the shared edge. The shared edge comprises individual pixels which come from two different images A and B as shown in the example 606 in FIG. 6. The cumulative RGB difference of each pair of corresponding pixels (from Image A and Image B illustrated as points in the example 606) are measured to get the color differences in the shared edge. The module 206 translates (308) the textures associated with each triangle in nine different directions (as shown by the example 604 in FIG. 6) to create other texture candidates for the triangle, and then applies (310) each of the triangle candidates until a seamless texture join is formed between the adjacent mesh triangles— as described in the MRF processing below.

Let each node denote a triangular mesh with a discrete set of optional texture labels. There are nine labels representing nine 2D image-space translation vectors. The module 206 wants to assign a best texture label X to each triangular mesh. This assignment is a hybrid combinatorial optimization, that can be expressed as an energy function:

$$\min_{l_1,\ldots,l_N} \sum_{i=1}^{N} E_i(x_i) + \lambda \sum_{[i,j] \in M} E_{ij}(x_i, x_j)$$

$$E_{ij}(x_i, x_j) = \sum_{n} \frac{(R_i - R_j)^2 + (G_i - G_j)^2 + (B_i - B_j)^2}{255^2}$$

This energy function forms an MRF problem. The first term calculates the data cost of each triangular mesh by projecting them onto different input images. Because the module 206 has already selected the best HD images with high resolution and contrast, the data term is zero in the MRF model. By setting this term as zero, the module 206 can then speed up the computation.

The second term calculates the smooth cost of texture discontinuities between the adjacent triangular meshes. It penalizes two different neighboring labels and ensures that the overall labeling is coherent and smooth. If two adjacent meshes have the same texture label, this term equals zero.

Figure 7:
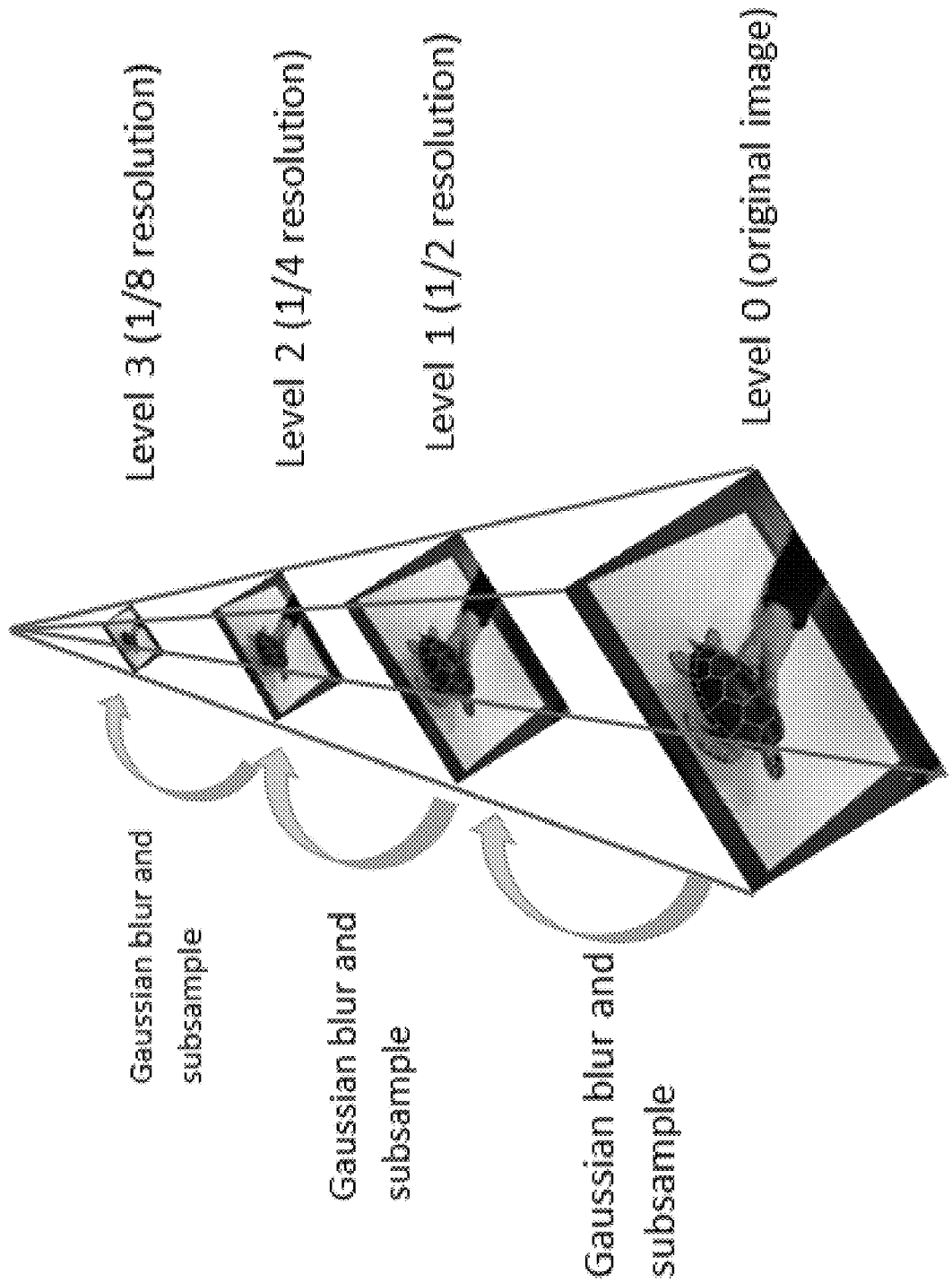
FIG. 7 is a diagram showing a pyramid downsampling technique of the image processing module.

The image processing module 206 can solve this MRF problem using an energy minimization algorithm. The module 206 downsamples the images in a Gaussian pyramid to halve the resolution in each dimension. Using this pyramid downsampling technique further optimizes performance. FIG. 7 is a diagram showing the pyramid downsampling technique of the image processing module 206. The optimization is performed in an iterative coarse-to-fine scheme (i.e., Level 0, original resolution→Level 1, ½ resolution-→Level 2, ¼ resolution→Level 3, ⅛ resolution). In the coarsest iteration, the result of the optimization provides the best label assignment at that pyramid resolution. The best result at the coarser level is used to seed the candidate labels at the next finer level.

The image processing module 206 then finds (312) the most probable labeling assigned to each triangular mesh using an optimal energy minimization algorithm, based upon the solution quality and running time. It should be appreciated that each triangular mesh can be assigned many labels, and finding the best labeling solution is computationally expensive and NP-hard. In some embodiments, the module 206 uses a method based on graph cut, called α-expansion (alpha-expansion), which refers to the min-cut/max-flow algorithms of graph theory into the combinatorial optimization. The minimal cut corresponds to the global minimization of the energy function. As its name suggests, alpha-expansion is an expansion move-making energy minimization algorithm. Given arbitrary label α, the optimal α-expansion move is the one that yields the minimum energy.

Figure 8:
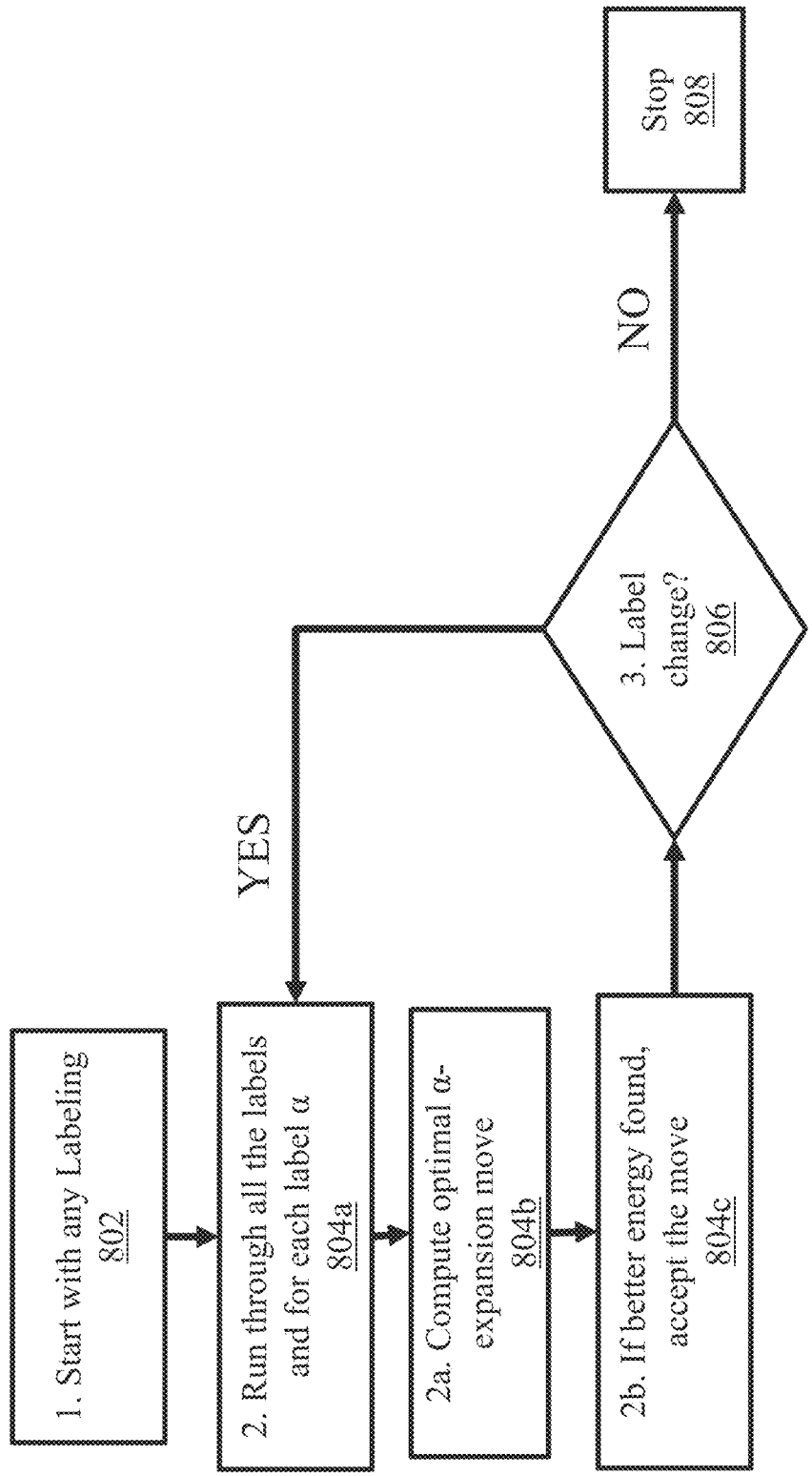
FIG. 8 is a flow diagram of an exemplary α-expansion move algorithm

FIG. 8 is a flow diagram of an α-expansion move algorithm. The image processing module 206 starts with an initial labeling 802 of the triangle meshes and uses iterative α-expansion to a series of moves to find the optimal labeling with the smallest energy. For example, the module 206 runs (804a) through all the labels and for each label α, the module 206 computes (804b) an optimal α-expansion move and accepts (804c) the move if a better energy value is found. The module 206 then determines (806) whether a label change is made. If so, the module 206 repeats steps 804a, 804b, and 804c. The module 206 stops (808) changing the labels of the random variables when there is no decrease in the energy.

Figure 9:
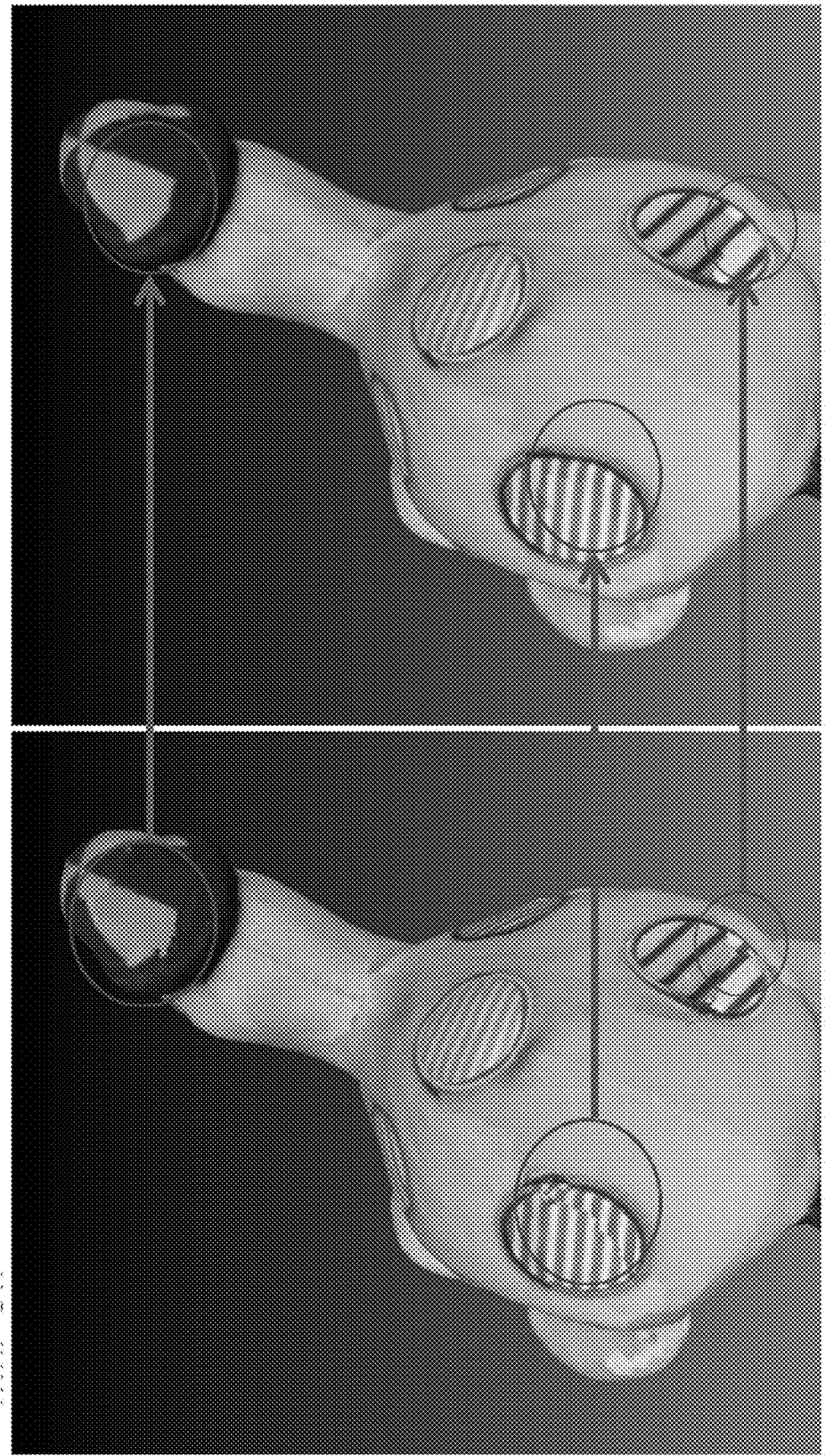
FIG. 9 depicts a textured 3D model before application of the texture alignment techniques described herein, and the same textured 3D model after application of the texture alignment techniques.

Turning back to FIG. 3, the image processing module 206 generates (312) a textured 3D model using the 3D model, the projected input image, and the texture candidates derived from the energy minimization processing described above. FIG. 9 depicts a textured 3D model 902 before application of the texture alignment techniques described herein, and the same textured 3D model 904 after application of the texture alignment techniques. As shown in FIG. 9, artifacts such as misaligned textures are fixed-resulting in a seamless, photorealistic texture that can be created in real-time.

The methods, systems, and techniques described herein are applicable to a wide variety of useful commercial and/or technical applications. Such applications can include, but are not limited to:

Augmented Reality/Virtual Reality, Robotics, Education, Part Inspection, E-Commerce, Social Media, Internet of Things—to capture, track, and interact with real-world objects from a scene for representation in a virtual environment, such as remote interaction with objects and/or scenes by a viewing device in another location, including any applications where there may be constraints on file size and transmission speed but a high-definition image is still capable of being rendered on the viewing device;

Live Streaming—for example, in order to live stream a 3D scene such as a sports event, a concert, a live presentation, and the like, the techniques described herein can be used to immediately send out a sparse frame to the viewing device at the remote location. As the 3D model becomes more complete, the techniques provide for adding full texture. This is similar to video applications that display a low-resolution image first while the applications download a high-definition image. Furthermore, the techniques can leverage 3D model compression to further reduce the geometric complexity and provide a seamless streaming experience;

Recording for Later 'Replay'—the techniques can advantageously be used to store images and relative pose information (as described above) in order to replay the scene and objects at a later time. For example, the computing device can store 3D models, image data, pose data, and sparse feature point data associated with the sensor capturing, e.g., a video of the scene and objects in the scene. Then, the viewing device 112 can later receive this information and recreate the entire video using the models, images, pose data and feature point data.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communications network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

The invention claimed is:

1. A system for dynamic real-time texture alignment for three-dimensional (3D) models, the system comprising a memory that stores computer-executable instructions and a processor that executes the computer-executable instructions to:
  receive a plurality of input images of one or more objects in a scene;
  generate a 3D model for at least one of the one or more objects in the scene, the 3D model comprising a plurality of mesh triangles;
  project each mesh triangle of the 3D model to one of the plurality of input images;
  measure a texture discontinuity between adjacent mesh triangles of the projected input image by comparing one or more color differences in a shared edge of the adjacent mesh triangles;
  translate a texture associated with each of the adjacent mesh triangles in a plurality of different directions to create texture candidates for each of the adjacent mesh triangles;
  apply each of the texture candidates to the corresponding mesh triangles until a seamless texture join is formed on the shared edge, comprising:
    determining an optimal texture labeling for each mesh triangle of the projected input image using an energy minimization algorithm;
    downsampling the projected input image to generate an intermediate image, the intermediate image comprising a decreased resolution in one or more dimensions;

determining an optimal texture labeling for each mesh triangle of the intermediate image using the energy minimization algorithm and the optimal texture labeling for each mesh triangle from the projected input image;

downsampling the intermediate image to generate a target image;

determining an optimal texture labeling for each mesh triangle of the target image using the energy minimization algorithm and the optimal texture labeling for each mesh triangle from the intermediate image;

selecting a texture candidate that corresponds to the optimal texture labeling for each mesh triangle of the target image; and applying the selected texture candidate to the corresponding mesh triangle of the projected input image; and generate a textured 3D model using the 3D model, the projected input image, and the texture candidates that form the seamless texture join for each adjacent mesh triangle.

2. The system of claim 1, wherein the optimal texture labeling for each mesh triangle of the target image comprises a texture labeling associated with a minimum energy value determined by the energy minimization algorithm using the optimal texture labeling for each mesh triangle from the intermediate image as input.

3. The system of claim 1, wherein the optimal texture labeling for each mesh triangle of the intermediate image comprises a texture labeling associated with a minimum energy value determined by the energy minimization algorithm using the optimal texture labeling for each mesh triangle from the projected input image as input.

4. The system of claim 1, wherein the optimal texture labeling for each mesh triangle of the projected input image comprises a texture labeling associated with a minimum energy value determined by the energy minimization algorithm.

5. The system of claim 1, wherein the energy minimization algorithm is an alpha-expansion algorithm.

6. The system of claim 1, wherein the plurality of input images are high-definition (HD) images.

7. The system of claim 1, wherein information corresponding to the textured 3D model is stored as an .obj file, an .mtl file, and a .jpg file.

8. The system of claim 1, wherein translating the texture associated with each of the adjacent mesh triangles in a plurality of different directions comprises translating each texture in nine different directions.

9. A computerized method of dynamic real-time texture alignment for three-dimensional (3D) models, the method comprising:

receiving, by a computing device, a plurality of input images of one or more objects in a scene;

generating, by the computing device, a 3D model for at least one of the one or more objects in the scene, the 3D model comprising a plurality of mesh triangles;

projecting, by the server computing device, each mesh triangle of the 3D model to one of the plurality of input images;

measuring, by the server computing device, a texture discontinuity between adjacent mesh triangles of the projected input image by comparing one or more color differences in a shared edge of the adjacent mesh triangles;

translating, by the server computing device, a texture associated with each of the adjacent mesh triangles in a plurality of different directions to create texture candidates for each of the adjacent mesh triangles;

applying, by the server computing device, each of the texture candidates to the corresponding mesh triangles until a seamless texture join is formed on the shared edge, comprising:

determining an optimal texture labeling for each mesh triangle of the projected input image using an energy minimization algorithm;

downsampling the projected input image to generate an intermediate image, the intermediate image comprising a decreased resolution in one or more dimensions;

determining an optimal texture labeling for each mesh triangle of the intermediate image using the energy minimization algorithm and the optimal texture labeling for each mesh triangle from the projected input image;

downsampling the intermediate image to generate a target image;

determining an optimal texture labeling for each mesh triangle of the target image using the energy minimization algorithm and the optimal texture labeling for each mesh triangle from the intermediate image;

selecting a texture candidate that corresponds to the optimal texture labeling for each mesh triangle of the target image; and applying the selected texture candidate to the corresponding mesh triangle of the projected input image; and generating, by the server computing device, a textured 3D model using the 3D model, the projected input image, and the texture candidates that form the seamless texture join for each adjacent mesh triangle.

10. The method of claim 9, wherein the optimal texture labeling for each mesh triangle of the target image comprises a texture labeling associated with a minimum energy value determined by the energy minimization algorithm using the optimal texture labeling for each mesh triangle from the intermediate image as input.

11. The method of claim 9, wherein the optimal texture labeling for each mesh triangle of the intermediate image comprises a texture labeling associated with a minimum energy value determined by the energy minimization algorithm using the optimal texture labeling for each mesh triangle from the projected input image as input.

12. The method of claim 9, wherein the optimal texture labeling for each mesh triangle of the projected input image comprises a texture labeling associated with a minimum energy value determined by the energy minimization algorithm.

13. The method of claim 9, wherein the energy minimization algorithm is an alpha-expansion algorithm.

14. The method of claim 9, wherein the plurality of input images are high-definition (HD) images.

15. The method of claim 9, wherein information corresponding to the textured 3D model is stored as an .obj file, an .mtl file, and a .jpg file.

16. The method of claim 9, wherein translating the texture associated with each of the adjacent mesh triangles in a plurality of different directions comprises translating each texture in nine different directions.

* * * * *